United States Patent [19]
Brinkworth

[11] 4,279,218
[45] Jul. 21, 1981

[54] CULTIVATION OF MARINE AND AQUATIC SPECIES

[76] Inventor: Peter L. Brinkworth, 183 Reynolds Rd., Mt. Pleasant, Australia

[21] Appl. No.: 11,999

[22] Filed: Feb. 13, 1979

[30] Foreign Application Priority Data

Feb. 15, 1978 [AU] Australia .............................. PD3398

[51] Int. Cl.³ .............................................. A01K 61/00
[52] U.S. Cl. ...................................................... 119/2
[58] Field of Search ........................ 119/2, 3, 4; 426/1

[56] References Cited
U.S. PATENT DOCUMENTS

| | | | |
|---|---|---|---|
| 485,422 | 11/1892 | McGray | 119/2 |
| 3,707,948 | 1/1973 | Dunathan | 119/4 |
| 3,815,546 | 6/1974 | Plante | 119/2 |
| 3,916,833 | 11/1975 | Serfling | 119/2 |
| 4,007,709 | 2/1977 | Wishner | 119/2 |

*Primary Examiner*—Hugh R. Chamblee
*Attorney, Agent, or Firm*—Harness, Dickey & Pierce

[57] ABSTRACT

A method of cultivating marine and aquatic species wherein the species are housed in habitats in which they remain for the major part of their growth cycle, said habitats being located within a body of water, servicing each habitat through a conduit or conduits to maintain a compatible environment for the species within the habitat so that the flow of water is substantially from the compatible environment to an incompatible zone located external to the habitat.

13 Claims, 6 Drawing Figures

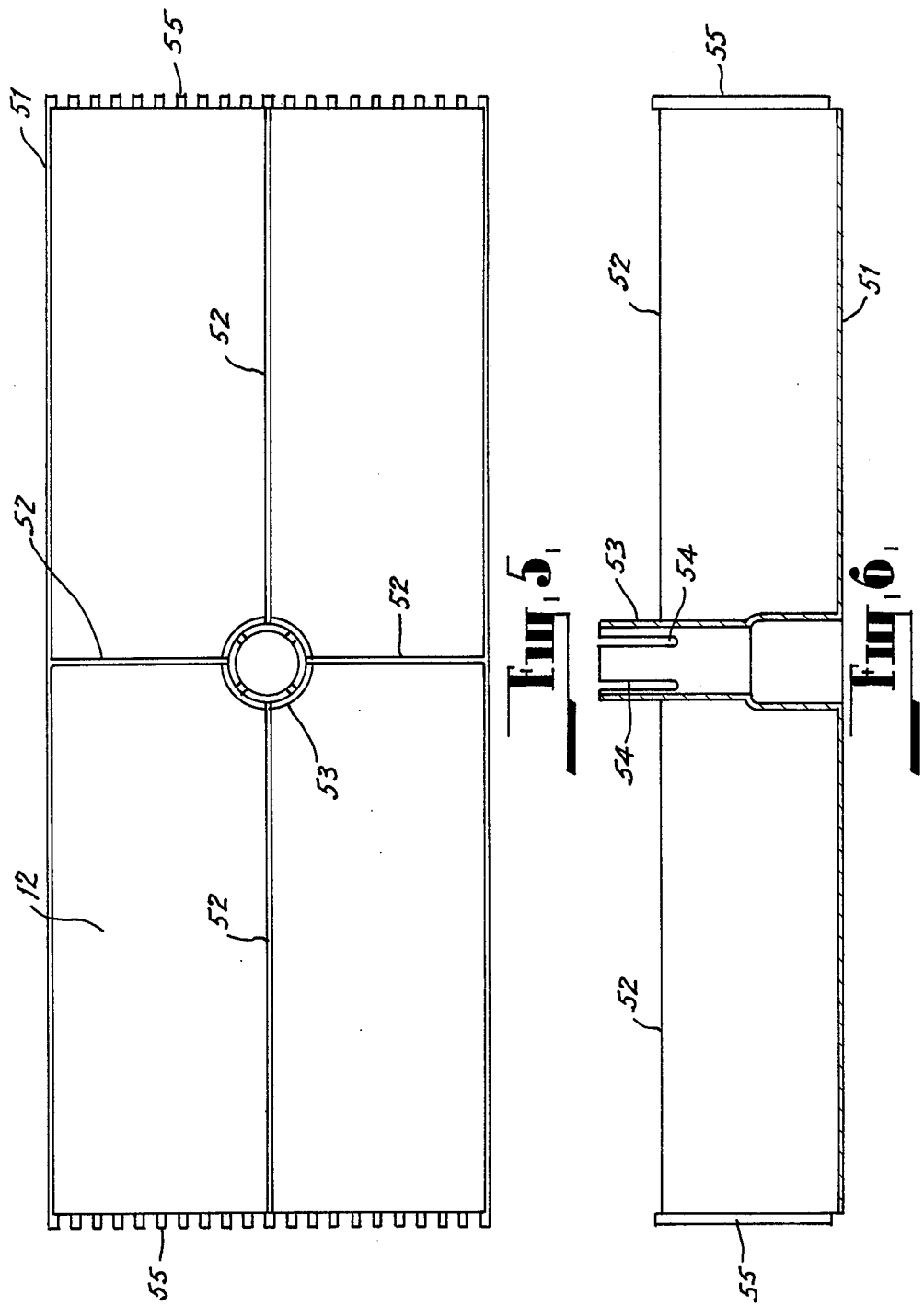

CULTIVATION OF MARINE AND AQUATIC SPECIES

This invention relates to the cultivation of a wide range of aquatic species, for example crustacea such as marron, (*cherax tenuimanus*) yabbies (*cherax destructor*) Murray lobster (*euastacus armatus*) and a wide range of marine species, for example, crustacea such as rock lobsters crayfish and crabs and molluscs such as oysters.

Hitherto many attempts of marine and aqua culture systems have met with rather dubious success and it is the intent of this invention to contrive a method and apparatus whereby the defects previously encountered are substantially overcome.

Previous attempts have largely involved the following aspects:

Reduction of Predation—by floating large cages in the ocean or by the covering of ponds and dams with bird-proof material and achieving turbidity within the water mass;

Reduction of Cannibalism—by the provision of man made habitats;

Pollution Removal—by the provision of specially constructed tanks with water flow channelled end to end through the tank, sometimes in a cascading fashion tank to tank, or in a circular fashion in a circular pond or tank;

Oxygenation—by the bubbling of air or oxygen either into the main water mass or into the inlet water or by turbulence or cascading methods of water handling;

Water Temperature—by heating and/or cooling of the water.

In the cultivation of fresh water crayfish such as marron, using known technology mortalities in the vicinity of 90% have been experienced and yields in the vicinity of 100 grammes per square meter of water surface over a two year growth period have been obtained.

It has been found that substantial improvement in the cultivation of marine and acquatic species can be achieved by providing within the water mass clearly defined three dimensional zones of compatible environments and incompatible environments and by housing the specie members in habitats located within the compatible environments and servicing each individual habitat through a conduit or conduits so that within the compatible environments uniform equilibrium conditions are maintained with respect to:

(i) temperature;
(ii) temperature stratification;
(iii) dissolved oxygen and nitrogen;
(iv) oxygen stratification;
(v) quality of the environment;
(vi) rate of feed;
(vii) rate of pollutant removal;
(viii) prevention of the introduction of disease;
(ix) prevention of infection by cross contamination from one specie member to the next.

The servicing conduits are so located that the flow of water is always in a direction from the compatible to the incompatible environments.

Thus in its broadest form the invention resides in a method of cultivating marine and aquatic species wherein the species are housed in habitats in which they remain for a major part of their growth cycle, said habitats being located within a body of water, servicing each habitat through a conduit or conduits to maintain a compatible environment for the species within the habitat so that the flow of water is substantially from the compatible environment to an incompatible zone located external to the habitat.

Preferably each member of the species is housed in an individual habitat.

The existence within the body of water of an incompatible zone provides a region for collection of pollutants such as excreta, urea, carbon dioxide, ammonia, nitrates, excess feed and reject feed which may be continuously removed by syphonic, mechanical or other suitable means.

The directional flow of water from any part of any incompatible or polluted zone to any part of the compatible environment is restricted physically. The physical restriction may be achieved by hydraulic means and not necessarily by any physical barrier.

It is possible to intensively cultivate the species by enmassing the specie habitats continuously along the length of the servicing conduit or conduits.

The enmassing of the habitats also provides an economical means of harvesting of the species in that the enmassed habitats can be lifted directly out of the water.

The various aspects of the invention will be better understood by reference to the following description of one specific embodiment as applied to the cultivation of marron (*cherax tenuimanus*) in conjunction with the accompanying drawings wherein:

FIG. 5 is a plan view of a member which can be assembled with like members to form a battery of burrows particularly suitable for the purposes of the present invention; and FIG. 6 is a sectional view of the member of FIG. 5.

Figure 1:
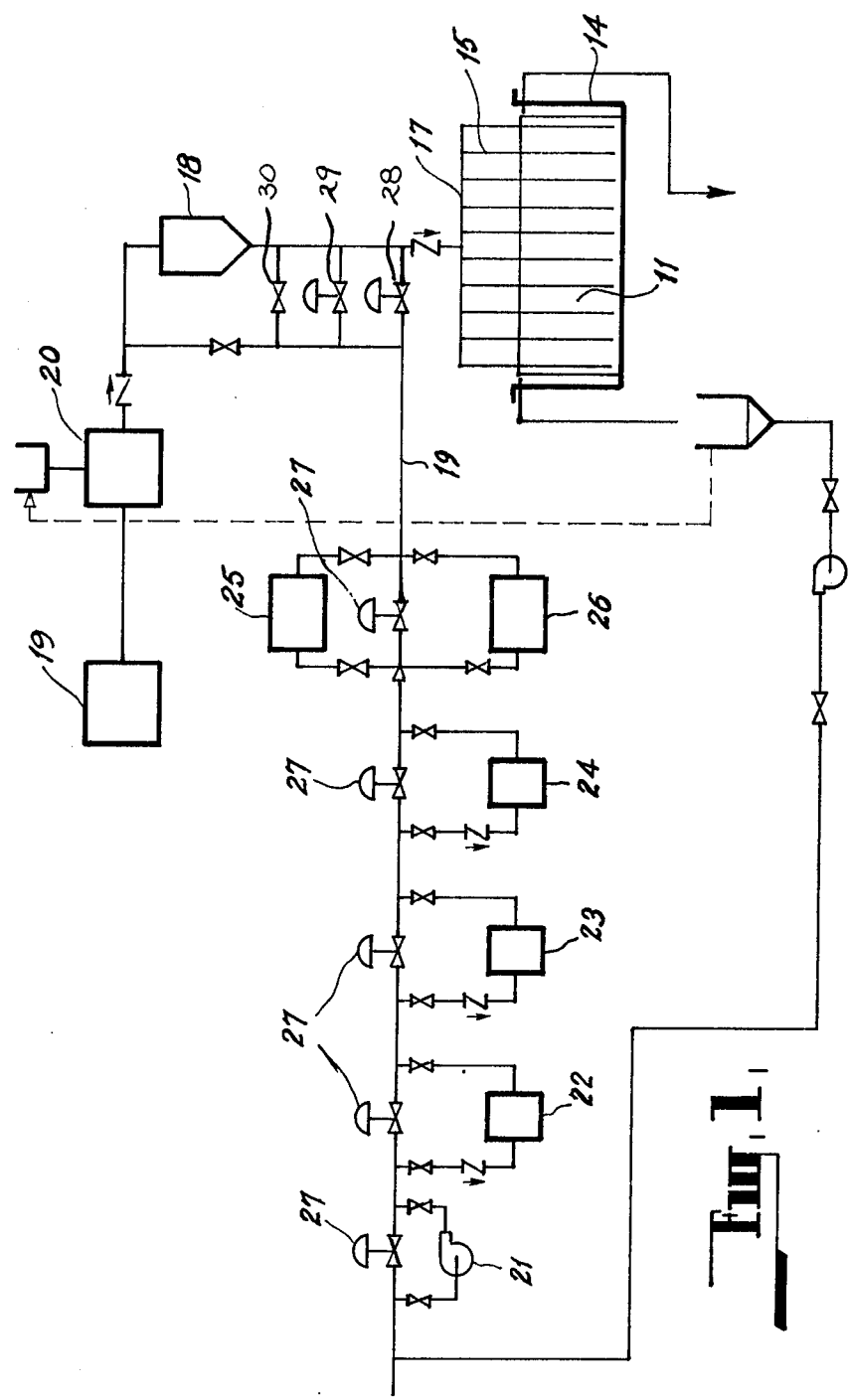
FIG. 1 is a diagrammatic representation of the system.
Figure 2:
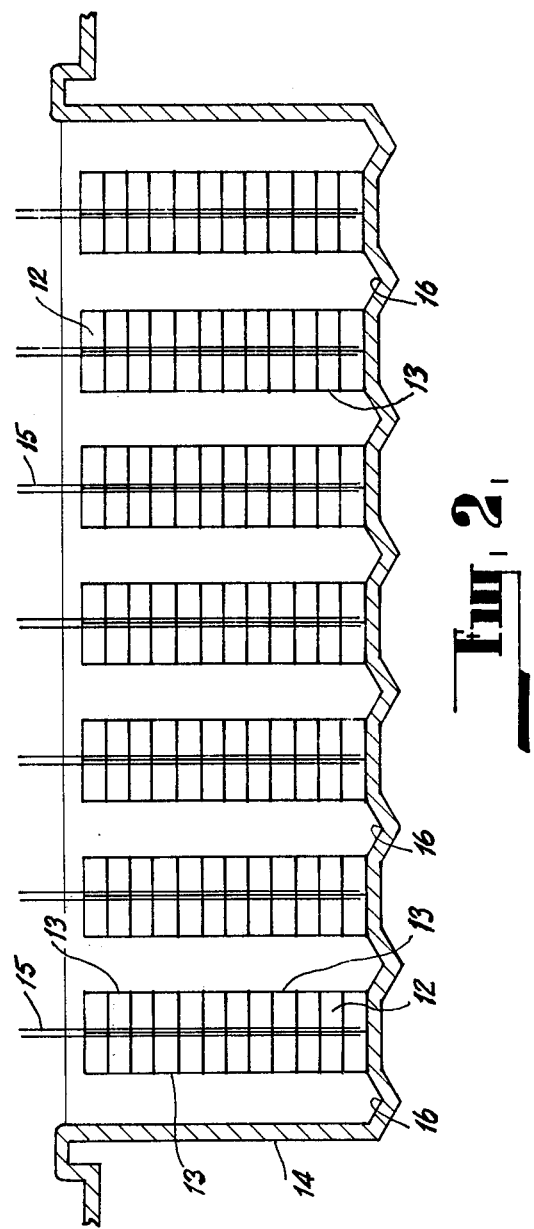
FIG. 2 is a sectional elevation of a battery of habitats used in the system.
Figure 3:
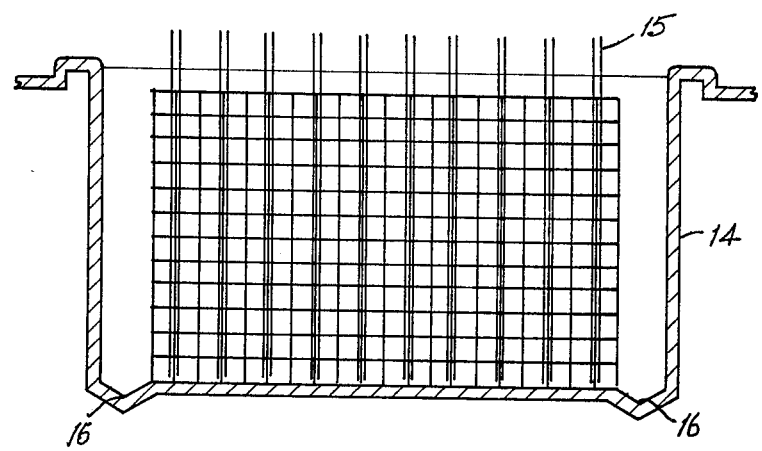
FIG. 3 is also a sectional elevation of the battery of habitats at right angles to the elevation of FIG. 2.
Figure 4:
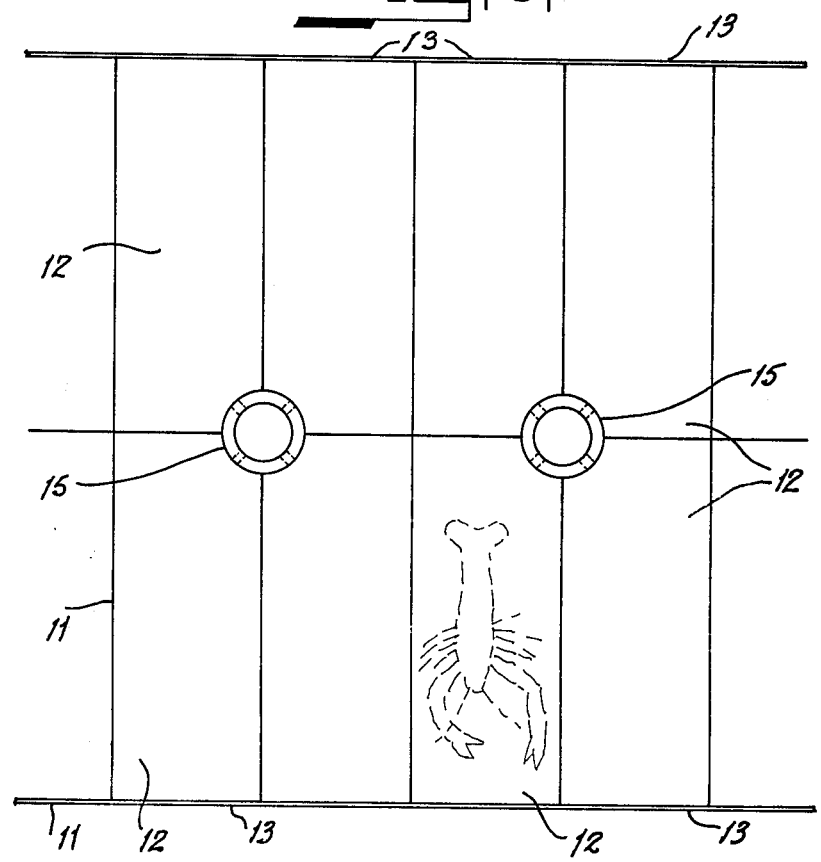
FIG. 4 is a plan view of a section of a battery showing a crustacean housed therein.

As shown in FIGS. 1, 2, 3 and 4 of the drawings, each battery 11 consists of a plurality of habitats or burrows 12 formed of plastic or other suitable non-corrodible material of regular geometrical proportions connected together vertically and horizontally so that each battery can be handled as a single unit. The size of each burrow is determined by the specie being cultivated and in the case of marron is preferably within the range of $20 \times 7 \times 5$ cms (700 cm$^3$) to $50 \times 40 \times 20$ cms (40000 cm$^3$). The batteries are formed by assembling the burrows, which are closed at one end and open the other, with the open ends facing in the same direction and are provided with mesh covers 13 which seal off the open end of each burrow and prevent the specie from leaving the burrow and through which water, food, excreta and the like can pass into the incompatible zone. Several batteries of burrows can be placed singularly or in pairs (as shown in the drawings) apart but parallel to each other in a tank 14 constructed of fibreglass or other material non-corrodible material. Tubes or conduits 15 are associated with each pair of batteries and are provided with a series of openings (not shown) through which material can pass into each burrow. Preferably more than one opening is associated with each burrow to reduce the possibility of blockage. Preferably the openings are of a width within the range of 1 to 50 mm. The floor of the tank between the batteries is recessed to form troughs 16 in which the pollutants can collect. The tubes 15 are connected to a manifold 17 which is in turn connected to a feed hopper 18 and a water supply line 19.

The food is preferably in the form of pellets of finely ground lucerne or pasture grasses but any other food acceptable to the marron may be used.

The bulk food is stored in a vessel 10 and fed into a food breakdown chamber 20 where it is mixed with a quantity of water and stored for approximately one week during which it is periodically agitated and aerated. This allows partial digestion of the food by bacteria which in turn facilitates feeding and digestion by the marron.

The partially digested food is in a state of fine subdivision and in the form of a suspension in water can be readily diluted so that it is relatively easy for the correct amount of food to be fed to each burrow as hereinafter described.

This feature of preliminary breakdown of the food prior to its being fed to the marron substantially reduces the polluting effect of the food when fed directly to the body of water and is also advantageous to systems of marine and aquatic culture other than that the subject of the present invention.

Thus in another aspect the invention resides in a method of cultivating marine and aquatic species wherein the food to be fed to the species is subjected to a preliminary breakdown.

Water is supplied to the manifold 17 by means of a pump 21 or by fixed static head and on the way to the manifold may pass through a water treatment plant 22, a nitrogen stripper 23 and oxygen dissolving unit 24, a cooling unit 25 and a heating unit 26. The water treatment plant 22 may include a water sterilizing unit and a softening unit.

The water supply line has incorporated therein valves 27 at least one associated with each component of the water treatment stage so that any one of the components may be utilised as required to bring the water to the desired condition prior to delivery to the manifold. The valves 27 may also provide a fail safe system whereby water will continue to circulate through the system in the event that there is a malfunction in any of the system components. Valve 28 is a normally open flow control valve while valve 30 is an automatic or manual by-pass purge valve. Valve 29 is a normally closed flow control set to operate at a higher flow rate than valve 28. In the fail safe condition valve 28 closes and valve 29 opens.

Preferably the water fed to the manifold is such that within each burrow the temperature is maintained within the range of 10° C. to 30° C. and oxygen content is between 40% and 100% (8.85 ppm of $O_2$ at 20° C.=100% approximately).

The amount of oxygen in the water may be increased beyond the 100% level by stripping nitrogen out of the water prior to the addition of oxygen. Thus by adjusting the relative levels of nitrogen and oxygen in the water the oxygen level of the water within the burrow can be readily maintained at the most desirable level. With higher oxygen levels the rate of water flow may be reduced.

This feature may also be used with advantage in systems of marine and aquatic culture other than the specific system described herein.

Thus in another aspect the invention resides in a method of cultivating marine and aquatic species wherein the relative levels of nitrogen and oxygen in the water used in the system are controlled in relation to the rate of water flow to maintain equilibrium conditions in the body of water inhabited by the species members.

Generally the flow of water through the manifold 17 and the servicing tubes is such that there is laminar flow. This ensures that the rate of flow into each burrow is the same irrespective of the level of the burrow in the body of water. In practice it has been found that a flow rate in the range of 2 ccs to 20 ccs per marron per minute achieves the desired environment.

At suitable intervals, generally of the order of one week a suitable quantity of food diluted with water is fed from the hopper through into the tubes also with laminar flow so that that the quantity of food fed to each burrow is substantially the same.

It is preferable to purge each burrow prior to the introduction of the food. This is achieved by the use of a high velocity turbulent flow of short duration. This purges each burrow of the excreta, unused food and rejected food and any other solid pollutants which have accumulated in the burrow. After the food has been fed to the burrows a very short post feeding burst of high velocity turbulent flow is used to ensure that the holes in the tubes are cleared of any food particles.

The solid and liquid and dissolved gaseous pollutants collect in the troughs located in the incompatible zone and are washed therefrom during a subsequent purging operation or by syphonic mechanical or other suitable means. During the resident time in the troughs the excreta is subjected to bacterial breakdown which facilitates subsequent handling of the solid pollutants which are collected in a hopper. If desired the food particles in the pollutants collected in the hopper may be separated and returned to the food breakdown chamber. Water separated from the solid pollutants may be returned to the water treatment stage.

When the marron have reached the desired size feeding is terminated and a water purge is used to ensure that the marron are purged of any excess excreta within their body.

Simultaneously the environmental temperature may be reduced to a level at which the marron reach a stage of desensitisation of their nervous system such stage being appropriate for humane processing procedure.

The batteries are then lifted clear of the tank and the marron removed from each burrow and replaced by juveniles after which they are returned to the tank.

The method described above is capable of producing approximately 200 marron of suitable size per square meter of water surface per annum which is a substantial advance on the prior art.

A form of burrow particularly suitable for use in the present invention is shown in FIGS. 5 and 6 of the drawings. A rectangular member 51 moulded from a suitable plastic material is divided into four compartments by upstanding walls 52 radiating from a central tubular portion 53. The tubular portion is provided at its upper end with a series of slots 54 at least one being associated with each of the compartments whilst the lower end is provided with a portion of enlarged diameter so that it can nest with the upper end of the tubular portion of an identical member. Each end of the burrow is provided with a vertical grille 55. When the members are nested together the compartments form rectangular burrows closed at the top, bottom rear and sides with a vertical grille at the front. The tubular portions define a conduit through which water and food is fed passing through the slots into the burrow so that it flows from the rear towards the front. To eliminate the possibility of blockages the tubular portion may be provided with two or more slots for each compartment.

The four interior walls may be made removable so that various sized marron or other species can be accommodated in the burrows.

The system of the present invention may be utilised to provide breeding stock throughout the year. A group of breed-marron are placed in a battery and reared in accordance with the method described above with the modification that the temperature of the water is varied to correspond with the natural temperature cycle which the marron would normally experience. Subsequent groups are also reared in the same way with the temperature cycle staggered so that it is possible to provide breeding stock at regular intervals throughout the year.

What is claimed is:

1. A method of cultivating marine and aquatic species wherein the species are housed in habitats in which they remain for the major part of their growth cycle, said habitats being located within a body of water, said habitats being in fluid communication with said body of water through restricted passages, supplying the interior of each habitat with pretreated water sufficient to maintain a compatible environment for the species within the habitat through an inlet in communication with a source independent of the surrounding body of water, the supply of pretreated water being of sufficient volume so that the flow of water is substantially from the compatible environment through the habitat and out to an incompatible zone located external to the habitat through said restricted passage means.

2. A method as claimed in claim 1 wherein each member of the species is housed in an individual habitat and each habitat has restricted passage means directly communicating each habitat with the surrounding incompatible zone so that the material discharged from one habitat will not enter another habitat.

3. A method as claimed in claim 1 or 2 wherein the pretreated water fed to each habitat has had food added to it, the water also being pretreated to contain sufficient oxygen to maintain a compatible environment for the occupant of the habitat.

4. A method as claimed in claim 3 wherein the water is introduced to the habitats in a laminar flow condition.

5. A method as claimed in claim 4 wherein the laminar flow is interrupted with short bursts of high velocity turbulent flow inlet water to purge pollutants from each habitat.

6. A method as claimed in claim 5 wherein the food is subjected to a preliminary decomposition prior to being fed through the conduit to the habitat.

7. A method as claimed in claim 6 wherein the food is mixed with water and held in storage with agitation and/or aeration until it has partially decomposed.

8. A method as claimed in any one of claims 1, wherein the temperature of the water is varied between different temperatures during the cultivation cycle to simulate the natural temperature cycle to stimulate breeding and/or growth.

9. A method as claimed in claim 8 wherein two or more groups are subjected to the temperature cycle, the cycle for each group being staggered on a time basis in relation to the other groups so that the temperature to which one group is subjected will be at a different temperature to which the other group is subjected at certain times.

10. A method as claimed in claim 1 wherein the water is introduced to the habitats in a laminar flow condition.

11. A method as claimed in claim 10 wherein the laminar flow is interrupted with short bursts of high velocity turbulent flow inlet water to purge pollutants from each habitat.

12. A method as claimed in claim 11 wherein the food is subjected to a preliminary decomposition prior to being fed through the conduit to the habitat.

13. A method of cultivating marine and aquatic species wherein the species are housed in habitats in which they remain for the major part of their growth cycle, said habitats being located within a body of water, each member of the species being housed in an individual habitat, supplying each habitat with water through an inlet to maintain a compatible environment for the species within the habitat, each habitat having restricted passage means communicating the respective habitat with the surrounding body of water independent of the others, and maintain sufficient flow of water from the inlet to each habitat so that the flow of water is substantially from the inlet to a compatible environment within the habitat and exhausted through the restricted passage means to an incompatible zone located external to the habitat and independent of the other habitat.

* * * * *